(12) United States Patent  
Meyer

(10) Patent No.: US 8,864,000 B2  
(45) Date of Patent: Oct. 21, 2014

(54) PORTABLE VISUAL DISPLAY PANEL MOUNTING DEVICE, SYSTEM AND METHOD

(76) Inventor: Paul W. Meyer, Slingerlands, NY (US)

( * ) Notice: Subject to any disclaimer, the term of this patent is extended or adjusted under 35 U.S.C. 154(b) by 997 days.

(21) Appl. No.: 12/869,394

(22) Filed: Aug. 26, 2010

(65) Prior Publication Data

US 2012/0047711 A1    Mar. 1, 2012

(51) Int. Cl.
| | |
|---|---|
| *B60R 7/00* | (2006.01) |
| *B60R 11/02* | (2006.01) |
| *F16M 11/10* | (2006.01) |
| *F16M 13/02* | (2006.01) |
| *F16M 11/04* | (2006.01) |
| *F16M 13/00* | (2006.01) |
| *B60R 11/00* | (2006.01) |

(52) U.S. Cl.
CPC .......... *F16M 11/041* (2013.01); *B60R 11/0235* (2013.01); *B60R 2011/0085* (2013.01); *B60R 2011/0084* (2013.01); *F16M 11/105* (2013.01); *B60R 2011/0071* (2013.01); *B60R 2011/0017* (2013.01); *F16M 13/022* (2013.01); *B60R 2011/0077* (2013.01); *B60R 2011/0073* (2013.01); *F16M 13/00* (2013.01); *B60R 2011/0059* (2013.01)
USPC ............ 224/275; 224/548; 224/553; 224/558

(58) Field of Classification Search
CPC ............... B60R 2011/0017; B60R 2011/0012; B60R 2011/008; B60R 2011/0276; B60R 2011/0059; B60R 7/043
USPC ......... 224/275, 276, 545, 547, 548, 549, 553, 224/929, 555, 558; 248/689, 691, 229.2, 248/229.23, 230.4, 231.51, 289.11, 291.1, 248/316.5
See application file for complete search history.

(56) References Cited

U.S. PATENT DOCUMENTS

| | | | |
|---|---|---|---|
| 1,318,564 A | * | 10/1919 | Jenkins .......................... 108/145 |
| 5,645,262 A | | 7/1997 | Hamlin |
| 5,842,715 A | | 12/1998 | Jones |

(Continued)

FOREIGN PATENT DOCUMENTS

FR           2882012 A1    8/2006

*Primary Examiner* — Adam Waggenspack  
(74) *Attorney, Agent, or Firm* — Schmeiser, Olsen & Watts, LLP

(57) ABSTRACT

A portable visual display panel mounting device is provided, the device comprising: a backing plate, having a visual display mounting side and an arm mounting side; a pair of articulating arms, each articulating arm including a ratcheting surface and a curved free end having an outermost tip; wherein the pair of articulating arms are pivotably connected at a common axis so that the ratcheting surfaces abut, and wherein at least one of the articulating arms is movably attached to the arm mounting side of the backing plate; and a common pin operable with a biasing member, wherein the common pin and the biasing member are located to facilitate pivotable connection of the articulating arms at the common axis so that the articulating arms are movable between a first position, wherein the curved ends of each articulating arm are proximately located next to each other, and a second position, wherein the curved ends of each articulating arm are disparately located away from each other; wherein, when the pair of articulating arms is in a second position, each tip of each curved free end of each articulating arm, being disparate each other, is located closer to the arm mounting side of the backing plate, than a resultant apex portion of the curved free end of each articulating arm.

17 Claims, 16 Drawing Sheets

(56) References Cited

U.S. PATENT DOCUMENTS

| | | |
|---|---|---|
| 6,092,705 A | 7/2000 | Meritt |
| 6,216,927 B1 | 4/2001 | Meritt |
| 6,619,605 B2 | 9/2003 | Lambert |
| 6,956,628 B2 | 10/2005 | Huang |
| 6,994,236 B2 | 2/2006 | Hsu |
| 7,048,163 B2 | 5/2006 | Albert et al. |
| 8,696,057 B2 * | 4/2014 | Wang ............... 297/188.06 |
| 2003/0076453 A1 | 4/2003 | Ma |
| 2005/0011920 A1 | 1/2005 | Feng |
| 2005/0196152 A1 | 9/2005 | Chen et al. |
| 2005/0200696 A1 | 9/2005 | Schedivy |
| 2006/0022003 A1 | 2/2006 | Zheng |
| 2007/0023599 A1 * | 2/2007 | Fedewa ............... 248/284.1 |

* cited by examiner

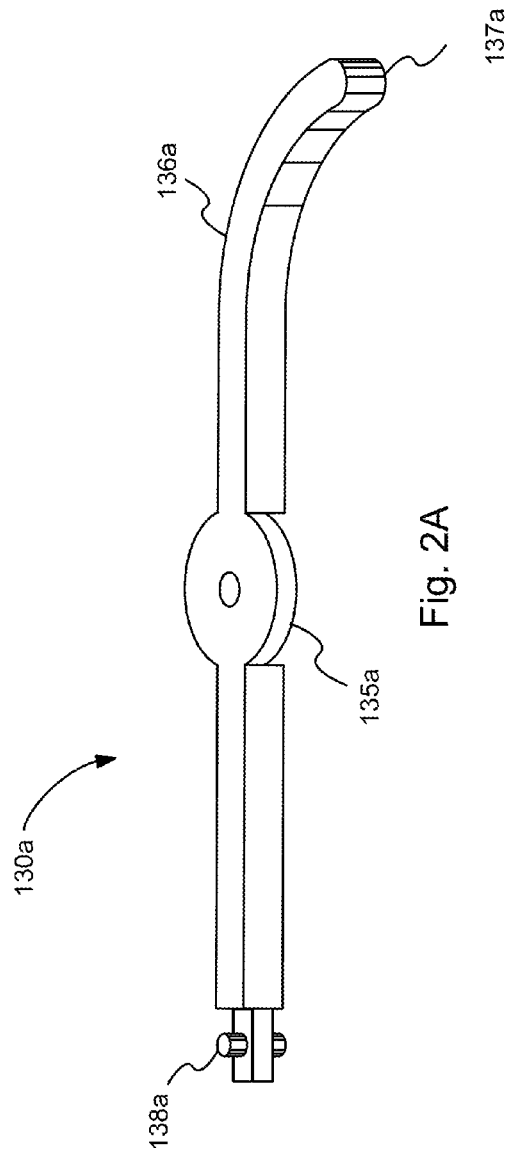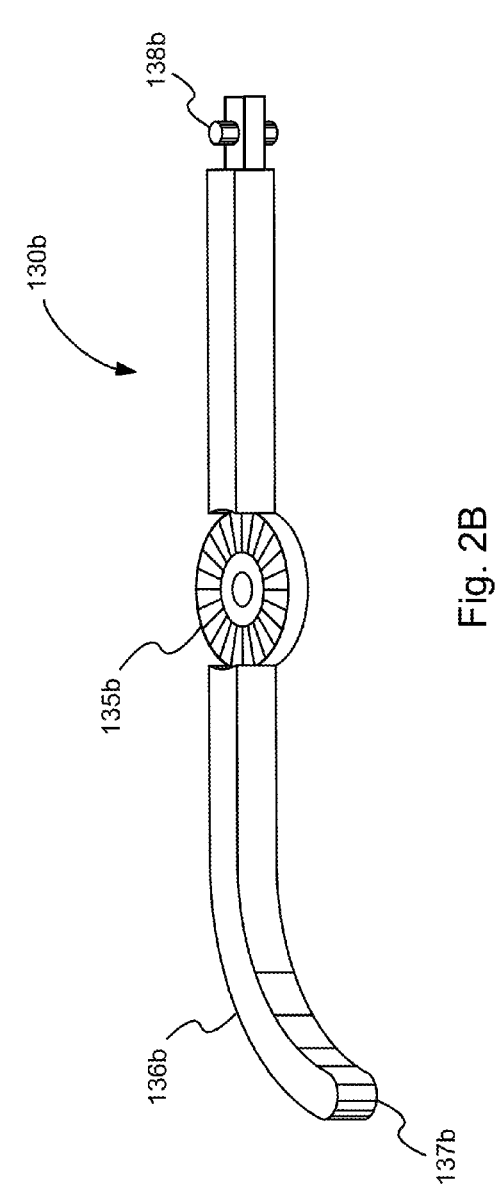
Fig. 2A
Fig. 2B

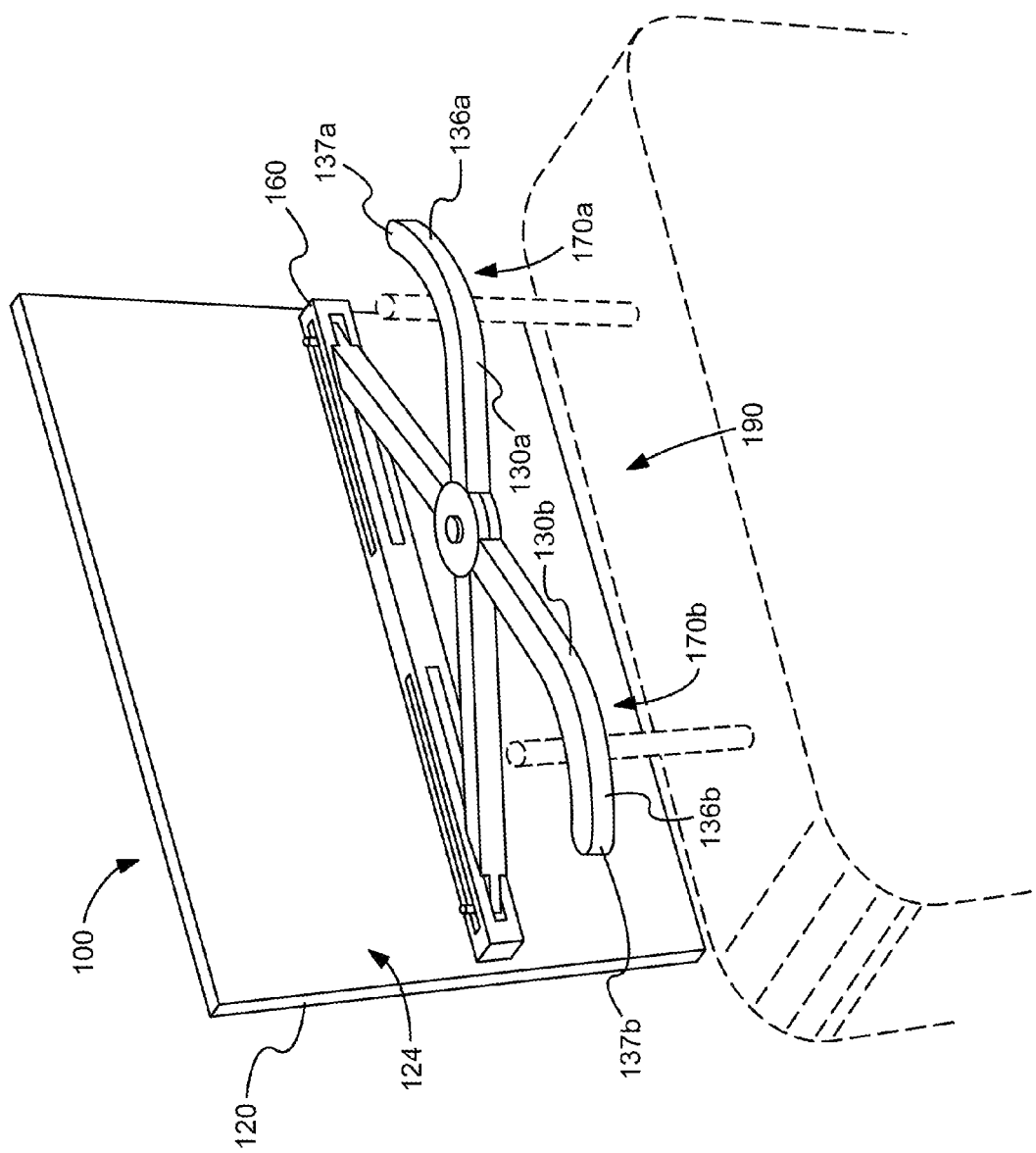

PORTABLE VISUAL DISPLAY PANEL MOUNTING DEVICE, SYSTEM AND METHOD

TECHNICAL FIELD

The present invention relates generally to portable visual display panels. More particularly, the present invention relates to a device for mounting a portable visual display panel to a vehicle headrest and associated methods of use thereof.

BACKGROUND

It is often desirous for passengers to utilize a visual display panel to view movies, television shows, video games, or other visual media, such as associated with personal digital or electronic devices having a visual display (e.g., DVD players, electronic reading devices, such as a Kindle™ or a Nook™, etc., tablet-PCs, such as an iPad®, or other various tablet-like visual interfaces), so that the passengers might be informed and/or entertained within a vehicle. Some vehicles include visual display systems having visual display panels as built-in fixtures. However, such vehicle visual systems having built-in visual display panels are often costly. Portable visual display panels are often less costly than built-in visual display panels, and portable visual display panels afford passengers with the ability to view visual media, or communicate electronically, within a vehicle without reliance on built-in systems, while also allowing passengers to utilize the portable visual display panels to view visual media at locations outside of the vehicle. But, when utilizing available portable visual display panels to view visual media within a vehicle, problems exist in relation to how such portable visual display panels may be securely located for safe, efficient, and effective viewing within the vehicle.

Accordingly, a need exists for providing a portable visual display panel mounting device, system and method.

SUMMARY

The following disclosure provides an apparatus and method for use with portable visual display systems that offers improved operability.

A first aspect described herein provides a portable visual display panel mounting device comprising: a backing plate, having a visual display mounting side and an arm mounting side; a pair of articulating arms, each articulating arm including a ratcheting surface and a curved free end having an outermost tip; wherein said pair of articulating arms are pivotably connected at a common axis so that said ratcheting surfaces abut, and wherein at least one of said articulating arms is movably attached to said arm mounting side of said backing plate; and a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other; wherein, when said pair of articulating arms is in a second position, each tip of each curved free end of each articulating arm, being disparate each other, is located closer to the arm mounting side of the backing plate, than a resultant apex portion of the curved free end of each articulating arm.

A second aspect described herein provides a method of mounting a portable visual display panel to a standard vehicle head rest having at least two spaced apart mounting posts or bars, said method comprising: providing a portable visual display device having hook and loop fasteners located on a side opposite a visual display; providing a portable visual display panel mounting device including: a backing plate, having a visual display mounting side and an arm mounting side; a pair of articulating arms, each articulating arm including a ratcheting surface and a curved free end having an outermost tip; wherein said pair of articulating arms are pivotably connected at a common axis so that said ratcheting surfaces abut, and wherein at least one of said articulating arms is movably attached to said arm mounting side of said backing plate; and a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other; wherein, when said pair of articulating arms is in a second position, each tip of each curved free end of each articulating arm, being disparate each other, is located closer to the arm mounting side of the backing plate, than a resultant apex portion of the curved free end of each articulating arm; maneuvering said articulating arms to a first position; passing said articulating arms, as located in a first position, between spaced apart mounting posts or bars of said standard vehicle head rest; and maneuvering said articulating arms to a second position, wherein each of said articulating arms separately center respective mounting posts or bars opposite resultant apex portions of the curved free ends of each articulating arm and work to engage and tighten each arm against each mounting post, as said articulating arms are disparately widened, to secure said portable visual display panel mounting device to said mounting posts or bars of said standard vehicle head rest.

A third aspect described herein provides a portable visual display system comprising: a portable visual display device having hook and loop fasteners located on a side opposite a visual display; a vehicle head rest having two spaced apart mounting posts or bars; and a portable visual display panel mounting device comprising: a pair of articulating arms, each articulating arm having a ratcheting surface and a curved free end; wherein said pair of articulating arms are pivotably connected at a common axis so that said ratcheting surfaces abut, and wherein at least one of said articulating arms is movably attached to an arm mounting side of a backing plate; and a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other; wherein, when said pair of articulating arms is in a first position, said pair of arms, being proximate each other, are configured to pass between said mounting posts or bars of said vehicle seat head rest, and, when said pair of articulating arms is moved into a second position, said pair of arms are configured to separately respectively engage, center and tighten against each mounting post, as said arms are disparately widened, to secure said portable visual display panel mounting device to said mounting posts or bars of said vehicle head rest.

A fourth aspect described herein provides a portable visual display system comprising: a portable visual display panel mounting device including: a backing plate operable with a complementary guide part; a pair of articulating arms, each articulating arm having a ratcheting surface and a curved free end; wherein said pair of articulating arms are pivotably connected at a common axis so that said ratcheting surfaces abut, and wherein at least one of said articulating arms is movably attached to an arm mounting side of a backing plate; wherein the opposing ends to the curved free ends of the articulating arms are complementary guided pin parts, which slide and fit into the complementary guided part of the backing plate; and a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other; a portable visual display device having a mounting clip, wherein said mounting clip has a lip configured to flex into a position around a portion of a visual display panel to retain and support the visual display panel, and wherein the mounting clip further includes a fastening portion attached to the back of said mounting clip, wherein the fastening portion slides to fit over and connect with an edge and associated notch of the backing plate of the portable visual display panel mounting device; and a vehicle head rest having two spaced apart mounting posts or bars; wherein, when said pair of articulating arms of said portable visual display panel mounting device is in a first position, said pair of arms, being proximate each other, are configured to pass between said mounting posts or bars of said vehicle seat head rest, and, when said pair of articulating arms is moved into a second position, said pair of arms are configured to separately respectively engage, center and tighten against each mounting post or bar, as said arms are disparately widened, to secure said portable visual display panel mounting device to said mounting posts or bars of said vehicle head rest.

BRIEF DESCRIPTION OF THE DRAWINGS

Some of the embodiments of this invention will be described in detail, with reference to the following figures, wherein like designations denote like members, wherein:

FIG. 2A depicts a side perspective view of an embodiment of an articulated arm having a ratcheting surface, in accordance with embodiments described herein;

FIG. 2B depicts a side perspective view of an embodiment of another articulated arm having an opposing ratcheting surface, in accordance with embodiments described herein;

FIG. 3C depicts a back side perspective view of an embodiment of an assembled portable visual display mounting device in a second position, in accordance with embodiments described herein;

DETAILED DESCRIPTION

Figure 1A:
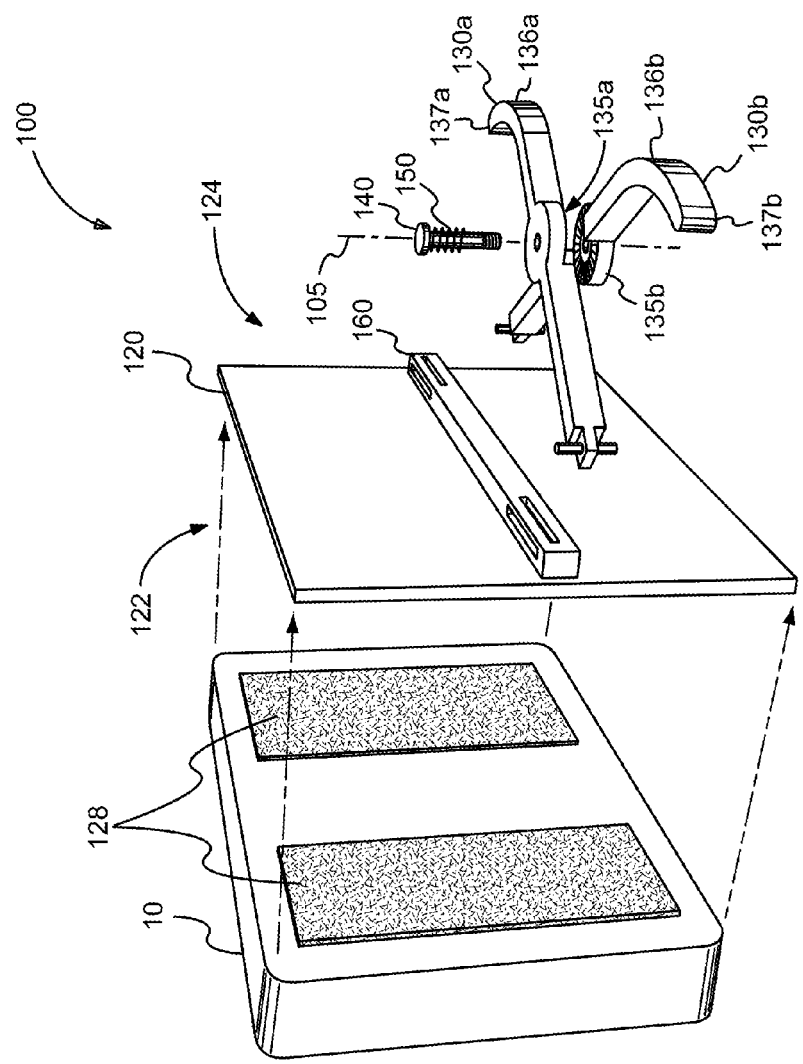
FIG. 1A depicts an exploded back side perspective view of an embodiment of a portable visual display mounting device prior to attachment to an embodiment of a visual display panel, in accordance with embodiments described herein.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Figure 1B:
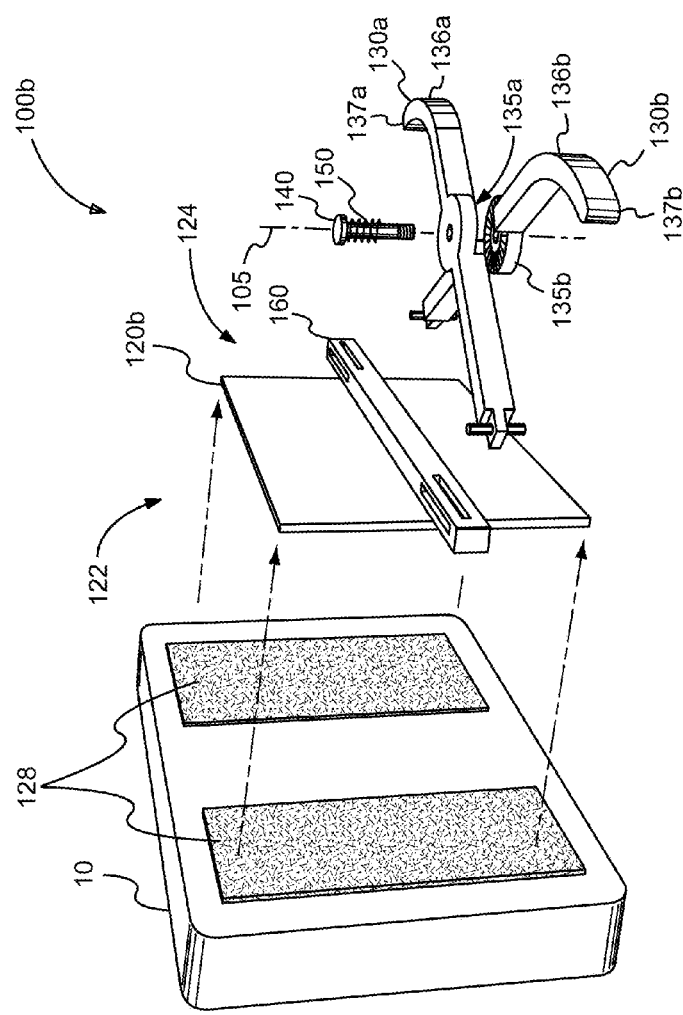
FIG. 1B depicts an exploded back side perspective view of another embodiment of a portable visual display mounting device having a smaller mounting or backing plate prior to attachment to an embodiment of a visual display panel, in accordance with embodiments described herein.

With reference to the drawings, FIG. 1A depicts an exploded back side perspective view of an embodiment of a portable visual display mounting device 100 prior to attachment to an embodiment of a visual display panel 10, in accordance with embodiments of the present invention. The portable visual display mounting device 100 includes a backing plate 120. The backing plate 120 has a visual display mounting side 122 and an arm mounting side 124. The backing plate 120 may be formed of rigid materials, such as rigid plastics, metals, wood, composite products, or other materials suitable for providing rigid support to a mounted visual display panel 10. FIG. 1B depicts an exploded back side perspective view of another embodiment of a portable visual display mounting device 100b having a smaller backing plate 120b. The smaller backing plate 120b may allow the visual display mounting device 100b to operate with a mounting dock that is configured to securely retain a visual display panel 10, such as mounting dock 500 shown in FIGS. 10A-13B.

Embodiments of a portable visual display mounting device may further include a pair of articulating arms 130a and 130b. At least one of the articulating arms 130a or 130b may be movably attached to the arm mounting side 124 of the backing plate 120. The arms 130a-b may be pivotably attached to each other about a central axis 105, via operation of a common pin 140 and associated biasing member 150.

Referring still to FIGS. 1A-1B and additionally to FIGS. 2A and 2B, which respectively depict side perspective views of an embodiment of an articulated arm 130a having a ratcheting surface 135a, and also depict an operably corresponding embodiment of another articulating arm 130b having an opposing ratcheting surface 135b, it can be seen that the pair of articulating arms 130a-b may be sized and shaped to complement each other physically and functionally. Each of the articulating arms 130a-b may have a curved free end 136a and 136b respectively, wherein each respective curved free end 136a-b may have an associated outermost tip 137a and 137b respectively. Each of the articulating arms 130a-b may have a complementary guided part 138a and 138b respectively located at the end of each respective articulating arm 130a and 130b being opposite the curved free end 136a and 136b of each articulating arm 130a and 130b. When pivotably connected at a common axis 105, the ratcheting surfaces 135a-b of the pair of articulating arms 130a-b may abut each other. The common pin 140 is operable with the biasing member 150, wherein the common pin 140 and the biasing member 150 are located to facilitate pivotable connection of the articulating arms 130a-b at the common axis 105.

Figure 3A:
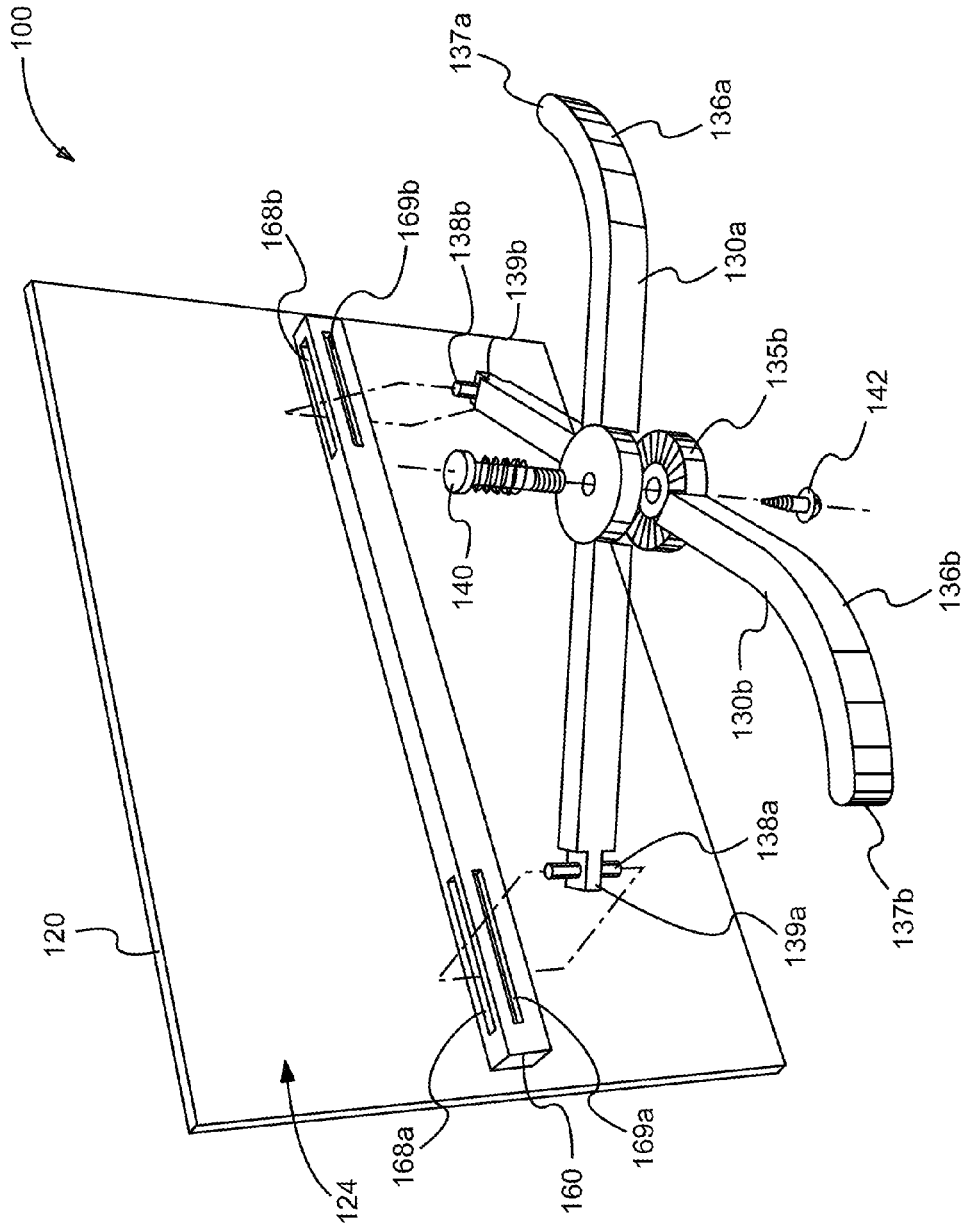
FIG. 3A depicts an exploded back side perspective view of an embodiment of a portable visual display mounting device, in accordance with embodiments described herein.

With further reference to the drawings, FIG. 3A depicts an exploded back side perspective view of an embodiment of a portable visual display mounting device 100, in accordance with embodiments of the present invention. The backing plate 120 of the portable visual display mounting device 100 may have a complementary guide 160 attached to or otherwise located on the arm mounting side 124 of the backing plate 120. The complementary guide 160 may be structured to accept a complementary guided part, such a pin 138a of insert member 139a of articulating arm 130a and/or such as pin 138b of insert member 139b or articulating arm 130b. Those in the art should appreciate that the complementary guided part(s), such as pins 138a and/or 138b of articulating arms 130a and/or 130b, do not have to be pin shaped, but may be structured to in a number of ways so long as the complementary guided part operably corresponds to the structure of a complementary guide 160 to help movably retain the articulating arm(s) 130a and/or 130b in functional positional relationship with the backing plate 120. For instance, the complementary guided part may be a pin, a ball, a wedge, a groove, a spindle, a roller, a magnet, a hollow geometrical structure, or any other operable guide part structure (as will be discussed further in exemplary fashion with respect to FIGS. 6 and 7 herein below). A portion of the complementary guided part(s), such as insert member(s) 139a and/or 139b may extend into a corresponding structure of the complementary guide 160. For instance, the insert members 139a-b may extend into corresponding grooves 169a-b of the complementary guide member(s) 160. Moreover, as inserted, the complementary guide pin parts 138a-b may operably extend into and movably engage corresponding slots 168a-b of the complementary guide member(s) 160. However, those in the art should recognize that the depicted structure is exemplary and the component parts may also be oppositely structured, wherein a portion of the complementary guide 160 extends into and operably engages corresponding structure(s) of the complementary arm(s) 130a and/or 130b. The complementary guide 160 may be movably positioned on the backing plate 120. For example, the complementary guide 160 may be affixed to the backing plate with fasteners or other operable mechanisms that permit the complementary guide 160 to be movably positioned on the backing plate 120. Thus, a user may, by preference, adjust the position of the complementary guide 160 on the backing plate 120 by loosening the fasteners and moving the guide member 160 to a new location and then re-tightening the fasteners. Such movable capability of the complementary guide member 160 may permit the backing plate to be located higher or lower with respect to a vehicle head rest 112 (see FIG. 9) to which the portable visual display panel mounting device 100 is attached.

As further depicted in FIG. 3A, the common pin 140 my operate with an articulating arm restraint 142, such as a screw or other fastener feature to retain the pin 140 in position between the pair of articulating arms 130a-b.

Figure 3B:
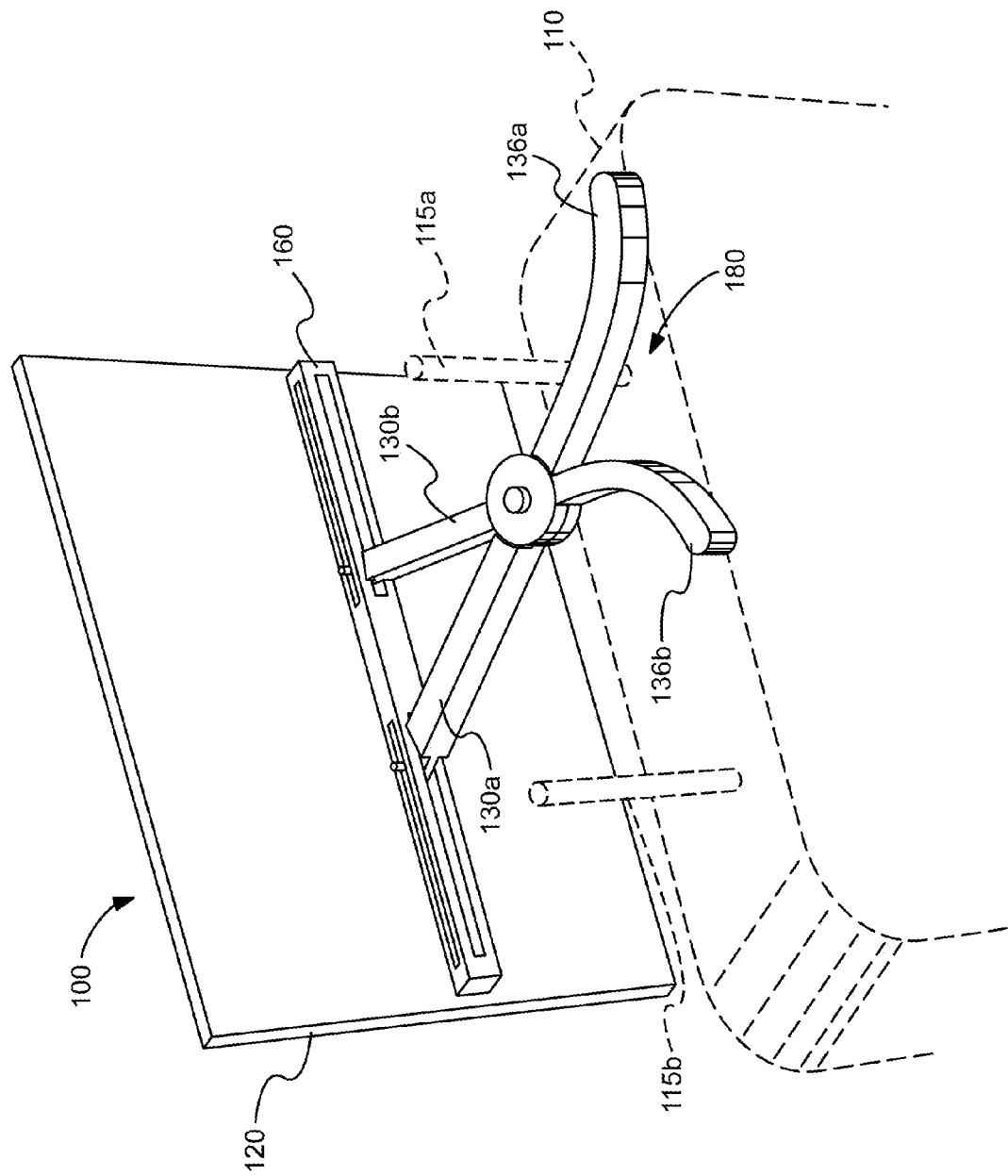
FIG. 3B depicts a back side perspective view of an embodiment of an assembled portable visual display mounting device in a first position, in accordance with embodiments described herein.

With continued reference to the drawings, FIGS. 3B and 3C depict back side perspective views of an embodiment of an assembled portable visual display mounting device 100 in a first position 180 and in a second position 190 respectively. The assembled portable visual display mounting device 100 should be operable so that the pair of articulating arms 130a-b are movable between a first position 180, wherein the curved ends 136a-b of each articulating arm 130a-b are proximately located next to each other, and a second position 190, wherein the curved ends 136a-b of each articulating arm 130a-b are disparately located away from each other. When the pair of articulating arms 130a-b is in a second position 190, each tip 137a-b of each curved free end 136a-b of each articulating arm 130a-b, being disparate each other, is located closer to the arm mounting side 124 of the backing plate 120, than a resultant apex portion 170a and/or 170b of the curved free end 136a and/or 136b of each articulating arm 130a and/or 130b. The apex 170a and/or 170b results because the curved structure of the articulating arm(s) affords a configuration wherein a point of the curve may obtain a maximum distance away from the arm mounting side 124 of the backing plate. This maximum-distance-away point on the structure of the curved free end(s) 136a and/or 136b of the articulating arm(s) 130a and/or 130b may constitute the resultant apex 170a and/or 170b.

When the pair of articulating arms 130a-b are located in a first position 180, the curved portions 136a-b of the articulating arms 130a-b are proximate each other. This proximate configuration renders a narrow arm paired arm 130a-b structure that may be passed between spaced apart mounting posts or bars 115a-b of said standard vehicle head rest 112 (see FIG. 9) of a vehicle seat 110 (see FIGS. 3B and 9). Once the pair of articulating arms 130a-b have been passed between the spaced apart mounting posts or bars 115a-b, then the portable visual display panel mounting device 100 may be secured to the posts or bars 115a-b. Securing the portable visual display panel mounting device 100 may therefore include maneuvering the articulating arms 130a-b to a second position 190, wherein each of the articulating arms 130a-b separately center respective mounting posts or bars 115a-b opposite resultant apex portions 170a-b of the curved free ends 136a-b of each articulating arm 130a-b. This maneuvering the pair of arms 130a-b toward a second position 190 may work to engage, center, and tighten each arm 130a and/or 130b against each mounting post or bar 115a and/or 115b, as the articulating arms 130a-b are disparately widened, to secure the portable visual display panel mounting device 100 to the mounting posts or bars 115a-b of the standard vehicle head rest 112 (see FIG. 9) of the vehicle seat (see FIGS. 3C and 9).

To assist operable movement of component parts of a portable visual display panel mounting apparatus 100, the apparatus, as described supra, may include a backing plate 120 having a complementary guide 160 on the arm mounting side 124 to accept a complementary guided part, such as pin(s) 138a and/or 138b of at least one articulating arm 130a and/or 130b. The articulating arms 130a-b may then be maneuvered between said first 180 and second 190 positions by slidably moving the complementary guided part 138a and/or 138b within corresponding structures of complementary guide 160.

Figure 4A:
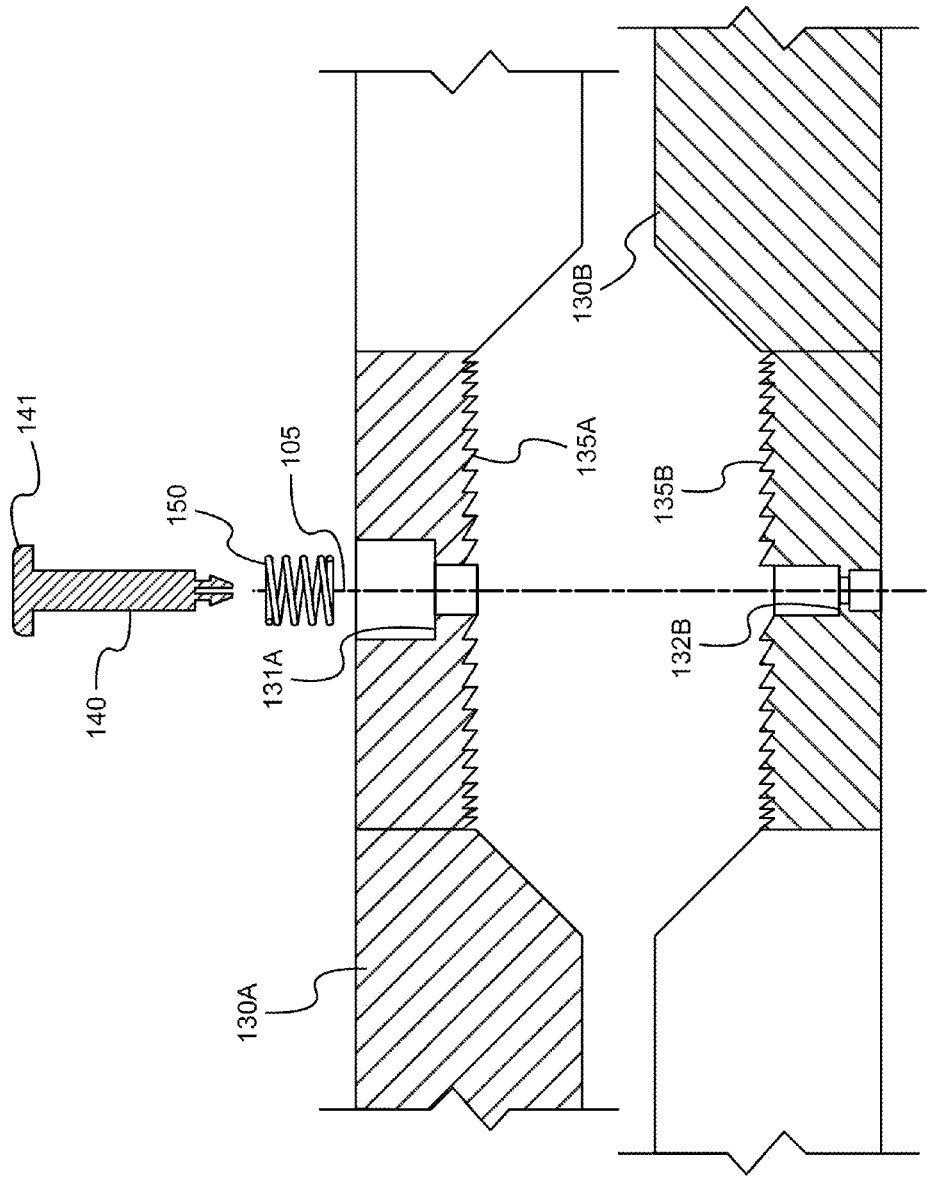
FIG. 4A depicts a side cross-section view of embodiments of a common pin, a biasing member and portions of a pair of articulating arms prior to assembly, in accordance with embodiments described herein.
Figure 4B:
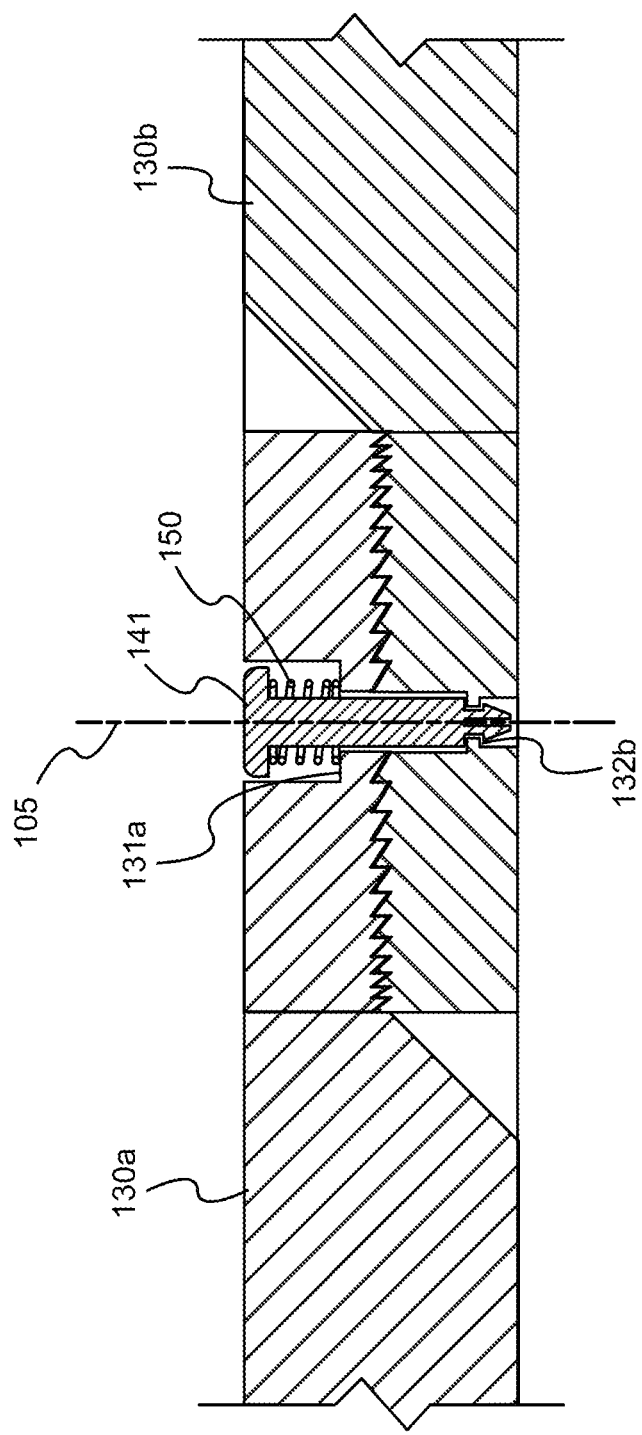
FIG. 4B depicts a side cross-section view of embodiments of a common pin, a biasing member and portions of a pair of articulating arms assembled in secure engagement, in accordance with embodiments described herein.

Referring still further to the drawings, FIGS. 4A and 4B depict side cross-section views of embodiments of a common pin, a biasing member and portions of a pair of articulating arms prior to assembly and after operable assembly, in accordance with embodiments of the present invention. As depicted, the biasing member 150 may be operable with the pin 140, so that the biasing member 150 in conjunction with the pin 140 acts upon the articulating arms 130a-b to drive the ratcheting surfaces 135a-b of the articulating arms 130a-b together to securely engage the ratcheting surfaces 135a-b in operable contact with each other. When the biasing member 150 is compressed, the ratcheting surfaces may operably disengage and become free to rotate with respect to each other. To assist in securing the articulating arms 130 together in operable assembly, the common pin may have a biasing member restraint 141, such as a flange or other protruding portion at one end for engaging and retaining the biasing member 150. Moreover, the common pin 140 may also have an articulating arm restraint 142 at the other end for engaging and retaining a pin retention member 132b of at least one articulating arm 130b. The biasing member 150 is placed between the biasing member restraint 141 of the common pin 140 and a biasing member rest portion 131a of at least one articulating arm 130a so as to facilitate compression forces against the articulating arms 130a-b to help drive the ratcheting surfaces 135a-b of the articulating arms 130a-b into operable engagement and movable abutment with each other. Because the ratcheting surfaces 135a-b include corresponding ratcheting features, rotational movement of the articulating arms 130a-b may be restricted in one direction. Hence, when the arms 130a and/or 130b are centered and tightened into a secure second position 190 about a corresponding mounting post or bar 115a and/or 115b, the portable visual display mounting device can be locked into secure position with respect to the head rest 112 (see FIG. 9) of vehicle seat 110 (see FIGS. 3B-3C and 9). The portable visual display panel may be disengaged from such a securely locked second position 190 by moving the common pin 140 to compress the biasing member 150, thereby allowing free rotational movement between said ratcheting surfaces 135a-b, so that the articulating arms 130a-b can then be freely moved again toward a first position 180, thereby loosening the portable visual display panel mounting device 100.

Figure 5:
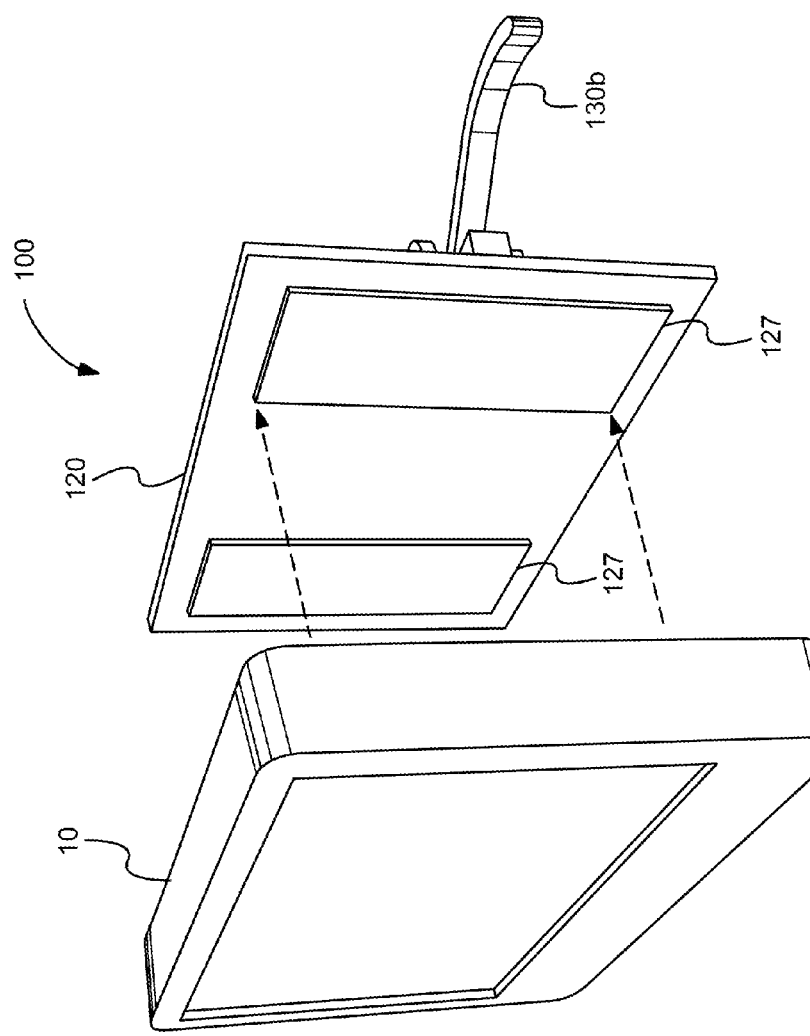
FIG. 5 depicts a front side perspective view of an embodiment of a portable visual display mounting device prior to attachment to an embodiment of a visual display panel, in accordance with embodiments described herein.

Turning to FIG. 5, it can be seen that attaching said portable visual display panel 10 to said portable visual display panel mounting device 100 may be accomplished by positioning hook and loop fasteners 127 for engagement and fastening with corresponding hook and loop fasteners (not shown) located on the rear of the portable visual display panel 10. Those in the art should appreciate that other fastening means may be implemented to attach embodiments of a portable visual display panel 10 to embodiments of a portable visual display panel mounting device 100. The portable visual display panel mounting device 100 may be operable to attach structures other than visual display panels. For example, book rack may be fitted with hook and loop fasteners allowing the book rack to be attached to the portable visual display panel mounting device 100; then a book may be placed on the rack and ultimately held by the mounting device 100 in a location respective of the vehicle head rest 112, to which the mounting device 100 is attached. Further objects, such as tablet devices (e.g., iPad®, or PC tablets), electronic readers (e.g., Kindle™, Nook™, Sony Digital Reader™, etc.), MP3 players, baby books, and/or Etch-a-Sketch® devices, may also be fitted with hook and loop fasteners, so as to be operably attached to embodiments of a portable visual display panel mounting device 100.

Figure 6:
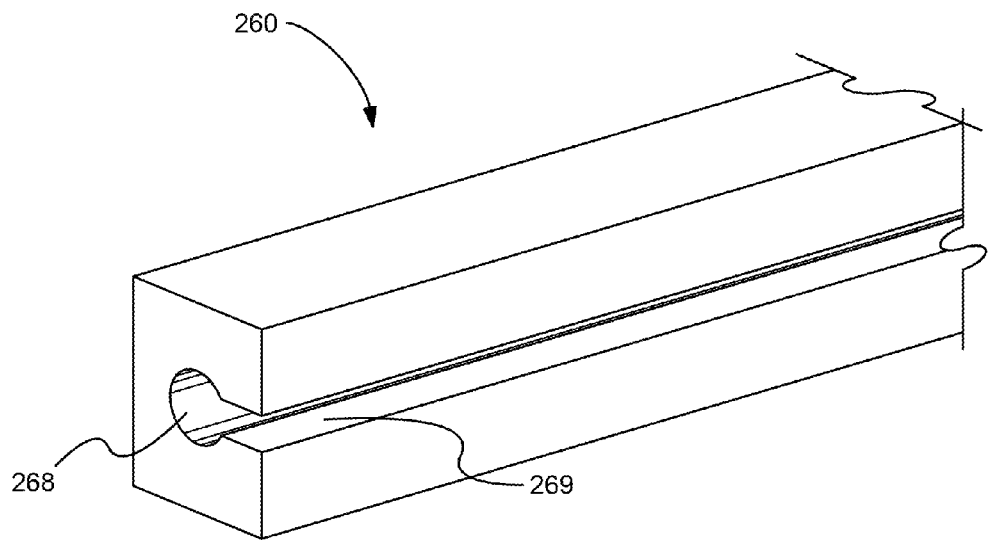
FIG. 6 depicts a side perspective view of a portion of an embodiment of a complementary guide component, in accordance with embodiments described herein.
Figure 7:
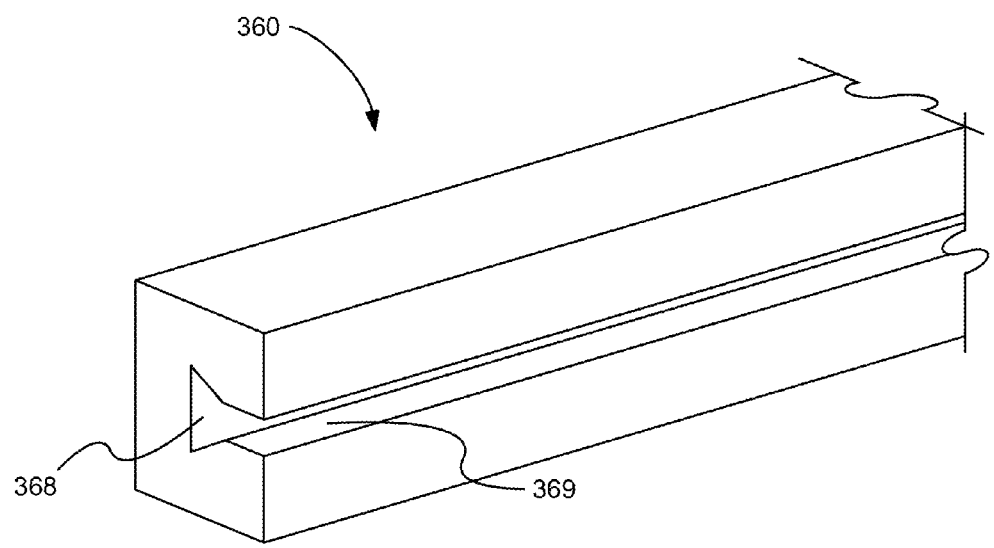
FIG. 7 depicts a side perspective view of a portion of another embodiment of a complementary guide component, in accordance with embodiments described herein.

In addition, those in the art should appreciate that there are various structural means that may be employed to operably provide complementary guides and complementary guide parts. For example, as mentioned supra, the complementary guide part may be a pin, a ball, a wedge, a groove, a spindle, a roller, a magnet, a hollow geometrical structure, or any other operable guide part structure, while the complementary guide may be any complementary matching structure. As such, FIGS. 6 and 7 depict side perspective view of portions exemplary embodiments of complementary guide component, such as complementary guide component 260 and complementary guide component 360. The complementary guide component 260 may include an insert groove 269 in communication with a ball shaped slot 268. The corresponding complementary guide part would therefore include a ball member affixed at the outer end of a peg portion (as shown, for example, in FIG. 12), extending from the end of an articulating arm 130a and/or 130b. The complementary guide component 360 may include an insert groove 369 in communication with a substantially triangular-shaped slot 368. The corresponding complementary guide part would therefore include a triangular-shaped member affixed at the outer end of a peg portion extending from the end of an articulating arm 130a and/or 130b. Those of ordinary skill will appreciate that other operable structures can be employed in accordance with the objectives of the present invention.

Figure 8:
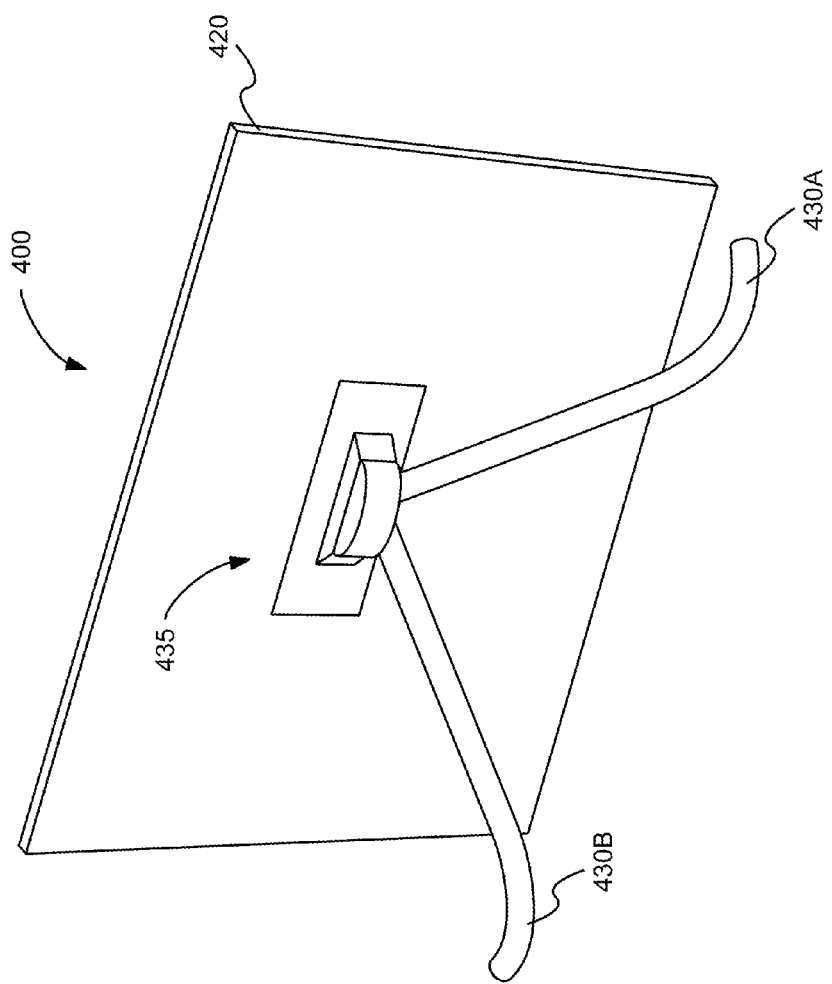
FIG. 8 depicts a back side perspective view of another embodiment of an assembled portable visual display mounting device having articulated arms mounted directly to a backing plate, in accordance with embodiments described herein.

Referring still further to the drawings, FIG. 8 depicts a back side perspective view of another embodiment of an assembled portable visual display mounting device 400 having articulated arms 430a-b mounted directly to a backing plate 420, in accordance with embodiments of the present invention. A ratcheting mechanism 435 may be provided to help provide free movement in only one direction with respect to each of the articulating arms 430a-b. As such, the portable visual display panel mounting apparatus 400 may be securely attached to a vehicle head rest 112 (see FIG. 9) in a manner that is similar to the way the portable visual display panel mounting device embodiment 100 is attached to a vehicle head rest 112.

Figure 9:
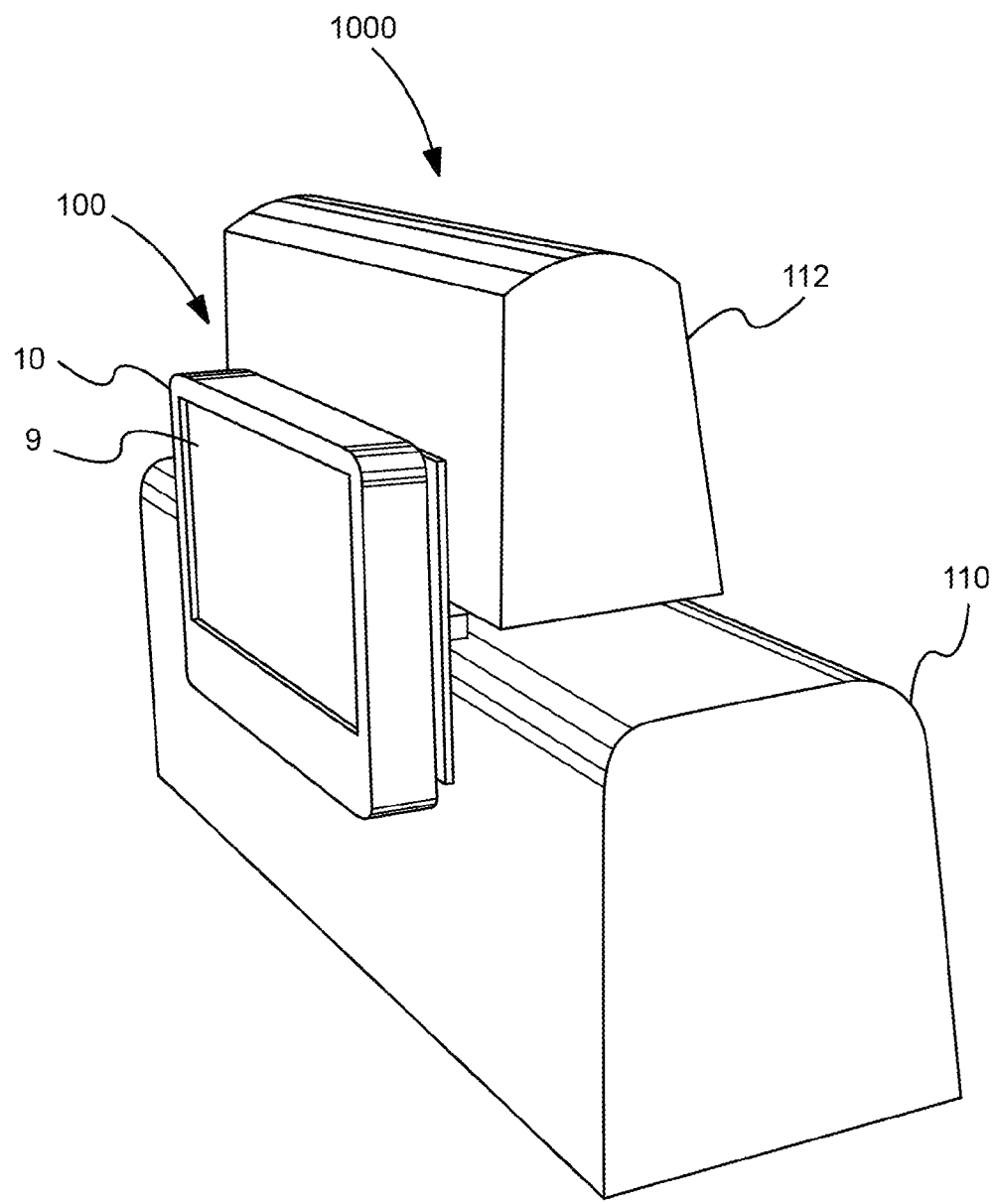
FIG. 9 depicts a front side perspective view of an embodiment of a portable visual display system, in accordance with embodiments described herein.
Figure 10:
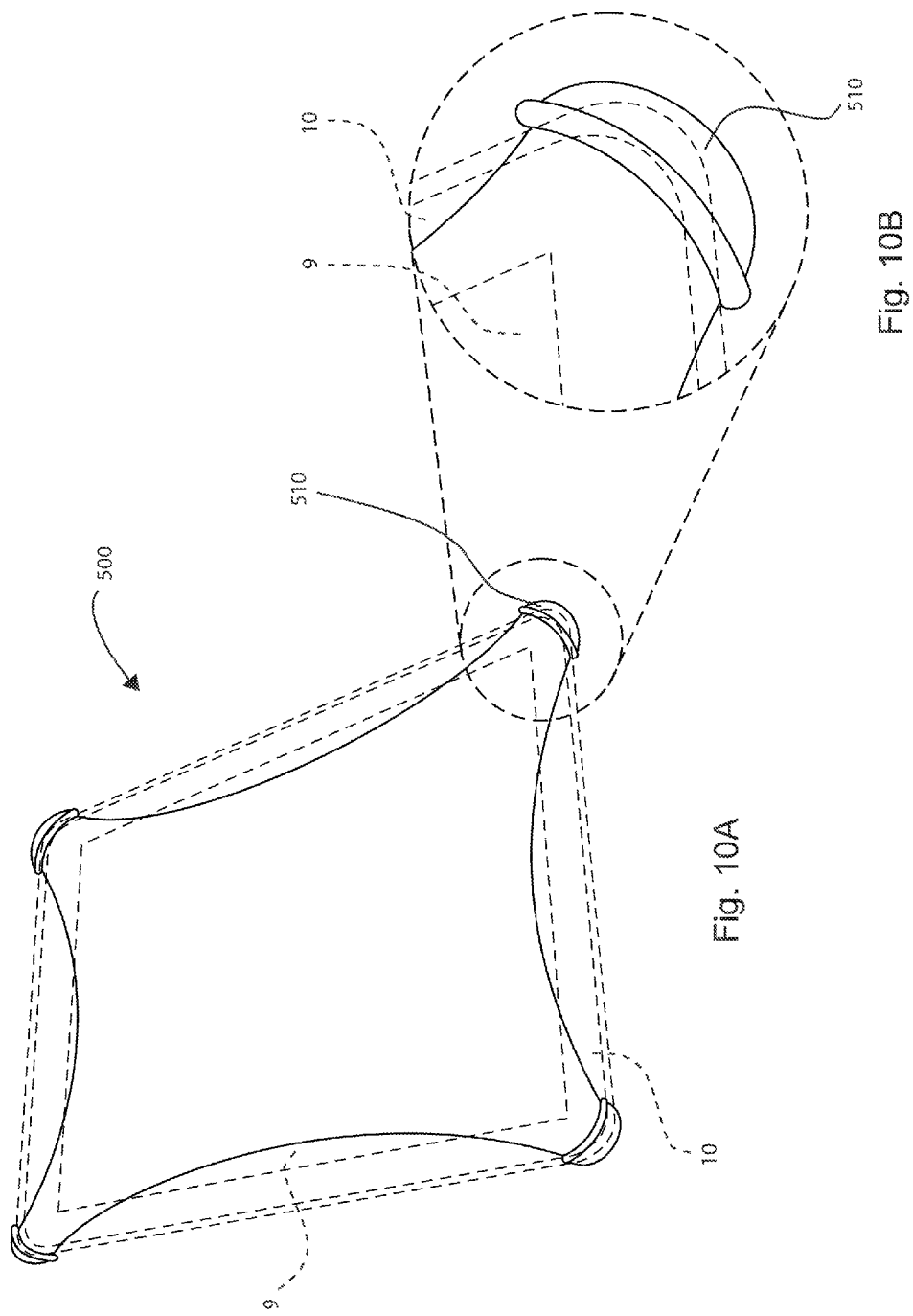
FIG. 10A depicts a front side perspective view of another embodiment of a portable visual display mounting device prior to attachment to an embodiment of a visual display panel, in accordance with embodiments described herein.
FIG. 10B depicts a magnified view of the corner of the embodiment of a portable visual display mounting device of FIG. 10A, prior to attachment of an embodiment of a visual display panel, in accordance with embodiments described herein.

With continued reference to FIGS. 1A-8 and now turning to FIG. 9, a front side perspective view of an embodiment of a portable visual display system 1000 is depicted, in accordance with embodiments of the present invention. The portable visual display system 1000 comprises a portable visual display device 10 having hook and loop fasteners (not shown) located on a side opposite a visual display 9. The system 1000 further includes a vehicle head rest 112 having two spaced apart mounting posts or bars 115a-b (see FIGS. 3B-3C). Furthermore, the portable visual display system includes a portable visual display panel mounting device 100 comprising a pair of articulating arms 130a-b. Each articulating arm 130a-b has a respective ratcheting surface 135a-b and a respective curved free end 136a-b. The pair of articulating arms 130a-b are pivotably connected at a common axis 105 so that the ratcheting surfaces 135a-b abut. At least one of the articulating arms 130a-b is movably attached to the arm mounting side 124 of the backing plate 120. The portable visual display panel mounting device 100 of the portable visual display system 1000 further includes a common pin 140 operable with a biasing member 150, wherein the common pin 140 and the biasing member 150 are located to facilitate pivotable connection of the articulating arms 130a-b at the common axis 105 so that the articulating arms 130a-b are movable between a first position 180, wherein the curved ends 136a-b of each articulating arm 130a-b are proximately located next to each other, and a second position 190, wherein the curved ends 136a-b of each articulating arm 130a-b are disparately located away from each other. When the pair of articulating arms 130a-b is in a first position 180, the pair of arms 130a-b, being proximate each other, are configured to pass between the mounting posts or bars 115a-b of the vehicle seat 110 head rest 112, and, when the pair of articulating arms 130a-b is moved into a second position 190, the pair of arms 130a-b are configured to separately respectively engage, center and tighten against each mounting post 115a-b, as the arms 130a-b are disparately widened, to secure the portable visual display panel mounting device 100 to the mounting posts or bars 115a-b of the vehicle head rest 112.

Referring still further to the drawings, FIG. 10A depicts a mounting clip or dock, 500, with a lip, retaining edge, or fastening border 510 on each corner of the mounting clip or dock 500. The mounting clip or dock 500 supports and securely retains the visual display panel 10 and its display 9. Mounting clip or dock 500 may be interchangeable, and may be sized and shaped to correspond with the size and shape of the particular type of portable visual display panel 10 in use. For example, the mounting clip or dock 500 may be sized to securely retain various visual display panels such as DVD players, electronic reading devices, such as a Kindle™ or a Nook™, etc., tablet-PCs, such as an iPad®, or other various tablet-like visual interfaces having panel-like structure. The lips 510 of the mounting clip or dock 500 may be fitted or molded to fit various portable visual display panels 10. Thus, the mounting clip or dock may secure embodiments of a visual display panel 10 for attachment with embodiments of a portable visual display panel mounting device, such as device 100, device 100b, or device 700. The corner lips fastening borders or retaining edges 510 may be constructed with a flexible plastic material to conform to the border or edges of different portable visual display panels 10, or the corner lips or edges 510 may be constructed with a hard plastic material, which may snap on, click over, compress down onto, or otherwise physically move to engage and retain different types of portable visual display panels 10. The outer surface of the lips, retaining edges, or fastening borders 510 of embodiments of a mounting clip or dock 500 may be curved or rounded to fit more modern portable visual display panels 10, to be more aesthetically pleasing, and to be used safely with passengers of a wide range of ages. However, any shape is contemplated that may effectively help an embodiment of a mounting clip or dock 500 to securely removably retain a visual display panel 10.

Figure 11:
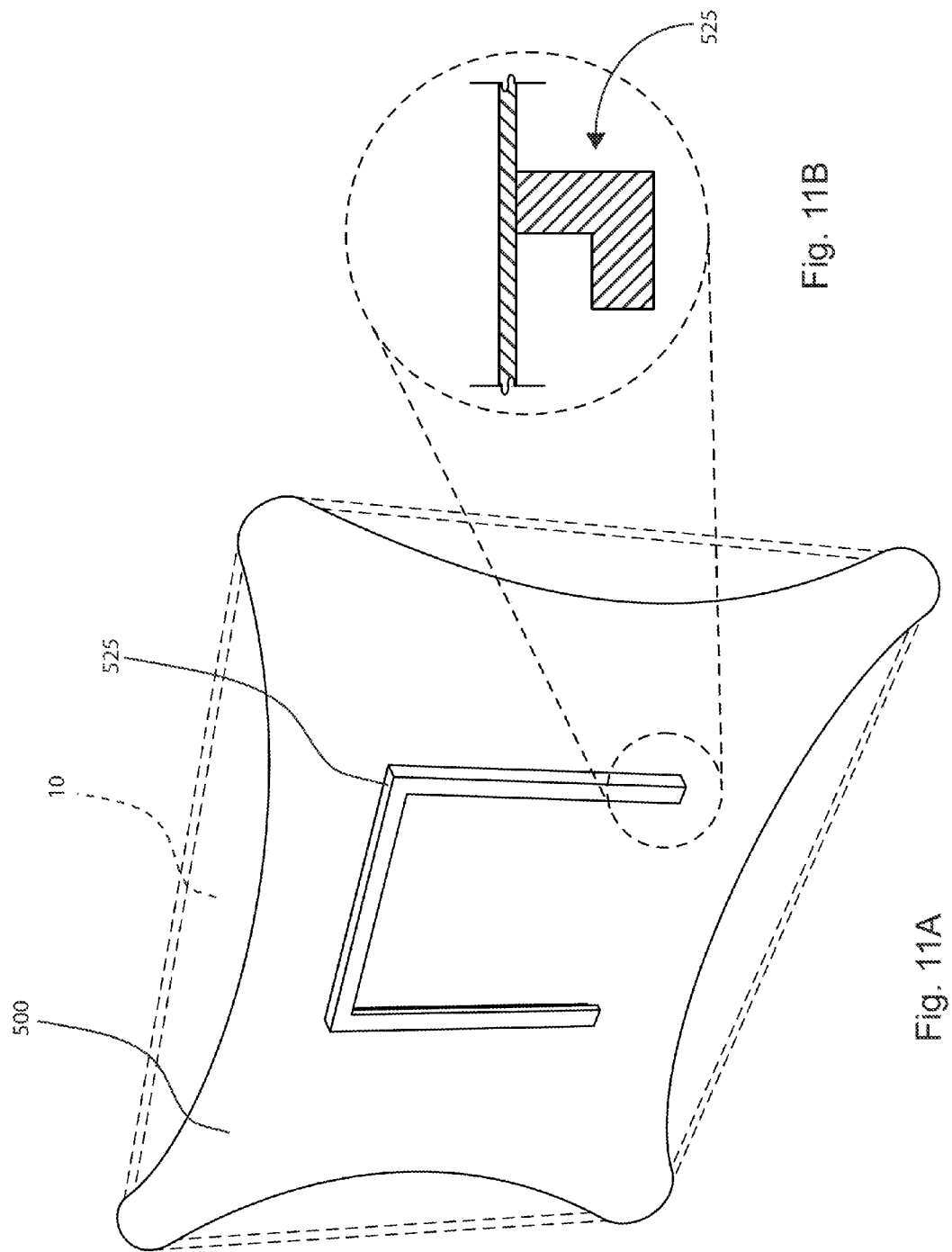
FIG. 11A depicts a top back side perspective view of another embodiment of a portable visual display mounting device showing the attachment of an embodiment of a visual display panel, in accordance with embodiments described herein.
FIG. 11B depicts a magnified cross-section view of a sliding or fastening portion of the back side perspective view embodiment of the portable visual display mounting device of FIG. 11A, in accordance with embodiments described herein.

Referring to FIGS. 11A and 11B, an embodiment of a mounting clip or dock 500 is depicted. As discussed, various embodiments of a visual display panel 10 may be retained by embodiments of a mounting clip or dock 500. The visual display panel 10 is depicted in dashed lines to emphasize that the shape of the video display panel 10 may vary and the mounting clip or dock 500 may still be configured to retain the embodied video display panel 10 even if the video display panel 10 has dimensions differing from that depicted in FIGS. 10A-11A and 13A-13B. The video display panel 10 may be clicked, snapped, clicked, clamped, stuck, hooked, docked, otherwise releasably mounted in place and retained by the lips, retaining edges, or fastening borders 510 or other retaining features of the mounting clip or dock 500.

The back of the mounting clip or dock 500 contains a fastening or mounting portion 525. The fastening or mounting portion 525 may be configured such that it can slide or otherwise be positioned into engagement with component features of various embodiments of a visual display mounting device, such as the backing plate 100 of visual display mounting device 100 (shown in FIG. 1A), or such as the backing plate 120b of visual display mounting device 100b (shown in FIG. 1B), or such as the backing plate 720 of video display mounting device 700 (shown in FIG. 12), for example. A magnified view of an embodiment of a fastening or mounting portion 525 of an embodiment of a mounting clip or dock 500 is depicted in FIG. 11B. The fastening or mounting portion 525 of the mounting clip or dock 500 specifically engages with, connects into, attaches onto, or otherwise physically interfaces with the visual display mounting device, such as device 100, device 100b, or device 700, so that the mounting clip or dock can be securely attached to the visual display mounting device, such as device 100, device 100b, or device 700, for example.

As depicted in FIGS. 11A and 11B, the fastening or mounting portion of the mounting clip or dock 500 the fastening or mounting portion 525 is located on the back of the mounting dock or clip 500 and is formed integrally with the back of the mounting dock or clip 500. However, those skilled in the relevant art should appreciate that the fastening or mounting portion 525 of the mounting dock or clip 500 may be either integral with the mounting dock or clip 500, or may be separately attachable to the mounting dock or clip 500 via operable attachment means. The fastening or mounting portion 525 may be formed of the same material as the material that makes up the back of the mounting dock or clip 500, or it may be formed of different material.

Figure 12:
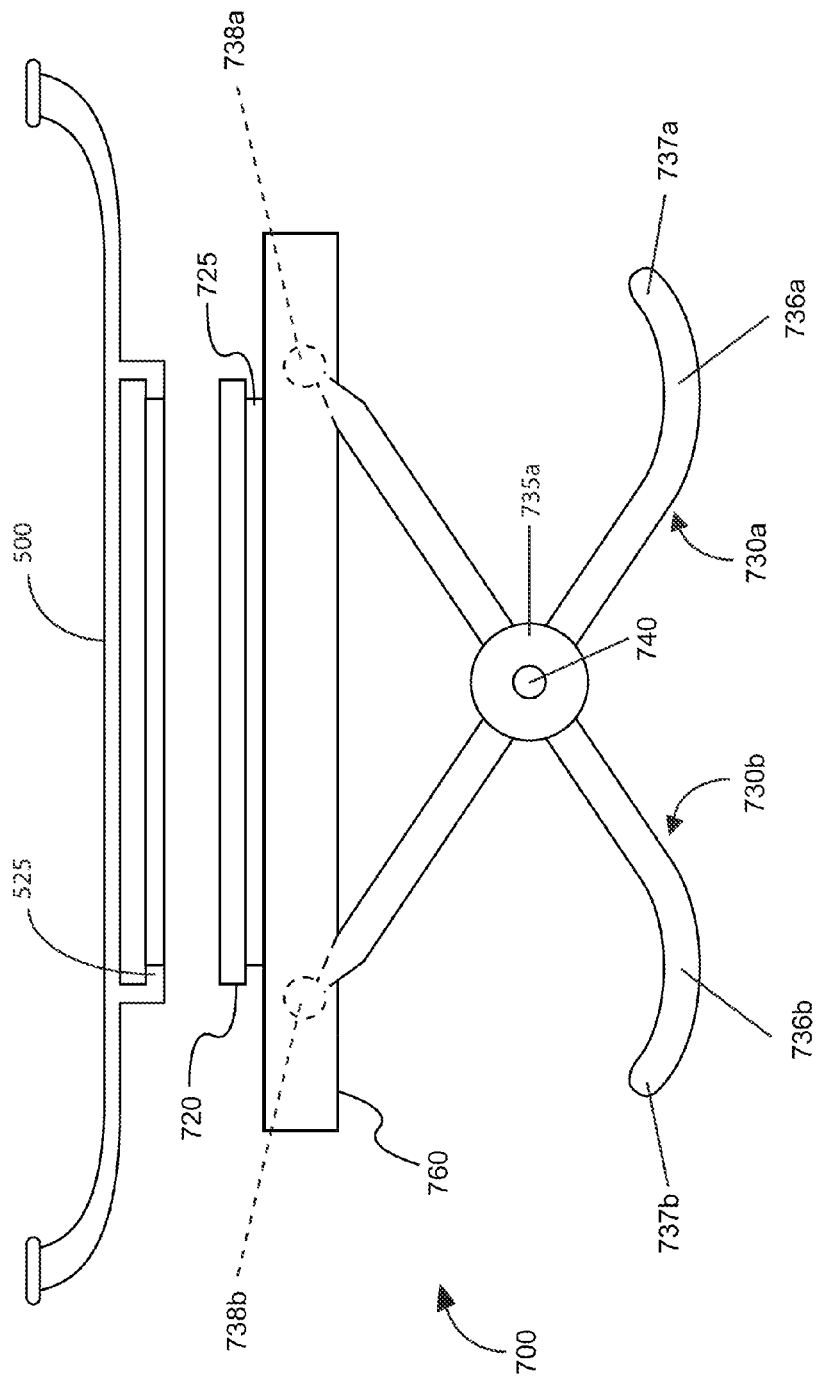
FIG. 12 depicts a bottom perspective view of still another embodiment of a portable visual display mounting device prior to attachment of an embodiment of a visual display panel, in accordance with embodiments described herein.

Embodiments of the fastening or mounting portion 525 of embodiments of a mounting clip or dock 500, as depicted in FIG. 11A, may exist as a sleeve protruding from the back of the mounting clip or dock 500 and sized to accept a backing plate, such as, for example, the backing plate 100 of visual display mounting device 100 (shown in FIG. 1A), or such as, for example, the backing plate 120b of visual display mounting device 100b (shown in FIG. 1B), or such as, for example, the backing plate 720 of video display mounting device 700 (shown in FIG. 12). The mounting portion may have a notch, groove, slot, channel, or other like guide-member, such as the blown-up cross-section view depicted in (FIG. 11B). In cross-section, the fastening portion is L-shaped. Such an L-shape cross section of the fastening or mounting portion 525 may be integrally formed with the mounting clip or dock 500, for example, by injection molding the entire mounting clip or dock 500 along with the fastening portion 525. However, embodiments of a mounting clip or dock 500 may include a fastening or mounting portion 525 that may be removable. For instance, the L-shaped fastening portion of FIGS. 11A-B might be clipped or otherwise attached to the mounting clip or dock 500. A removable fastening portion 525 would be desired if an embodiment of the mounting clip or dock 500 is used in a manner that requires removal of the fastening portion 525.

Referring still further to the drawings, FIG. 12 depicts a bottom view of the mounting clip or dock 500, and fastening or mounting portion 525, such as an L-shaped sleeve. Moreover, as further depicted, the mounting clip or dock 500 is not yet attached to the backing plate 720 of one embodiment of the portable visual display mounting device 700 (not shown). With respect to the depicted embodiments, the mounting or fastening portion 525 of the mounting clip or dock 500 slides onto the backing plate 720 and fits securely over the interlocking edge and associated notch 725 of the backing plate 720. The backing plate 720 and interlocking edge with associated notch 725 may be composed of wood, plastic, metal, composite material or another durable and fairly rigid material. It is preferable that a secure connection is achieved between the fastening or mounting portion 525 of the mounting clip or dock 500 and the backing plate 720 of the visual display mounting device 700 so an embodiment of a visual display panel 10 (such as the visual display panels shown in FIGS. 1A, 1B, 5, 9, 10, 11A, 13A, and 13B) is stably and securely mounted and retained as part of the portable visual display system 1000, to allow ease of viewing in a vehicle. As embodied, the interlocking outer edge and associated notch 725 help supply a stable connection for the mounting clip or dock 500 fastening portion 525 and the necessary strength and stiffness for operably supporting the weight of a portable visual display panel 10. Articulating arms 730a, 730b with curved free ends 736a, 736b are connected with a common pin 740 at a ratcheting surface 735a. The ends of the articulating arms 730a, 730b opposite the outermost tips 737a, 737b, are complementary guide pin parts 738a, 738b, which are ball-shaped in one embodiment, and can fit or slide into the complementary guide 760 of the portable visual display mounting device.

Figure 13B:
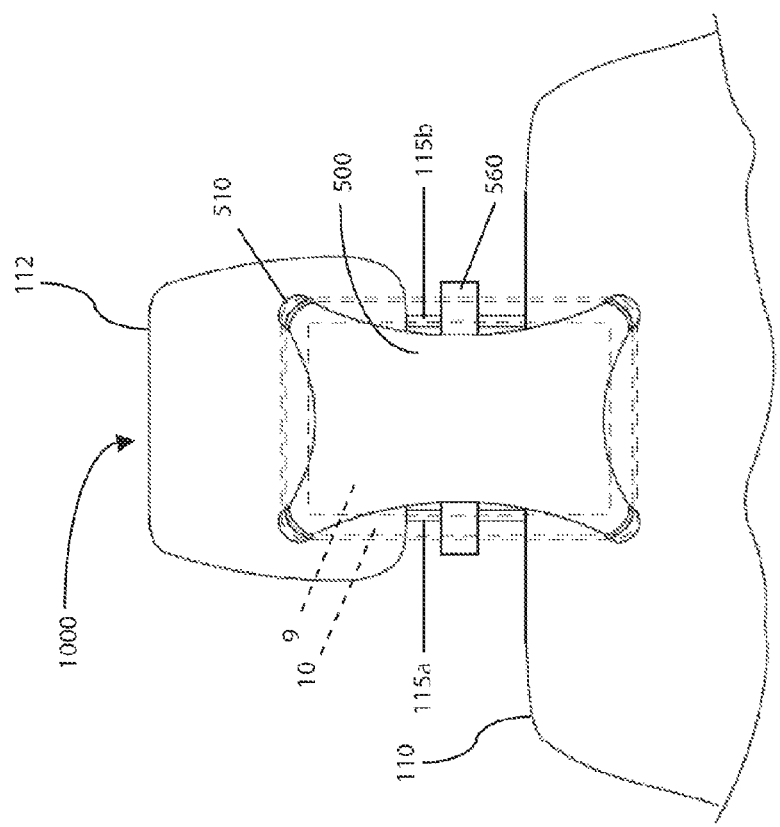
FIG. 13B depicts a front side perspective view of another embodiment portable visual display mounting device, showing the attachment of an embodiment of a visual display panel in portrait view, in accordance with embodiments described herein.
Figure 13A:
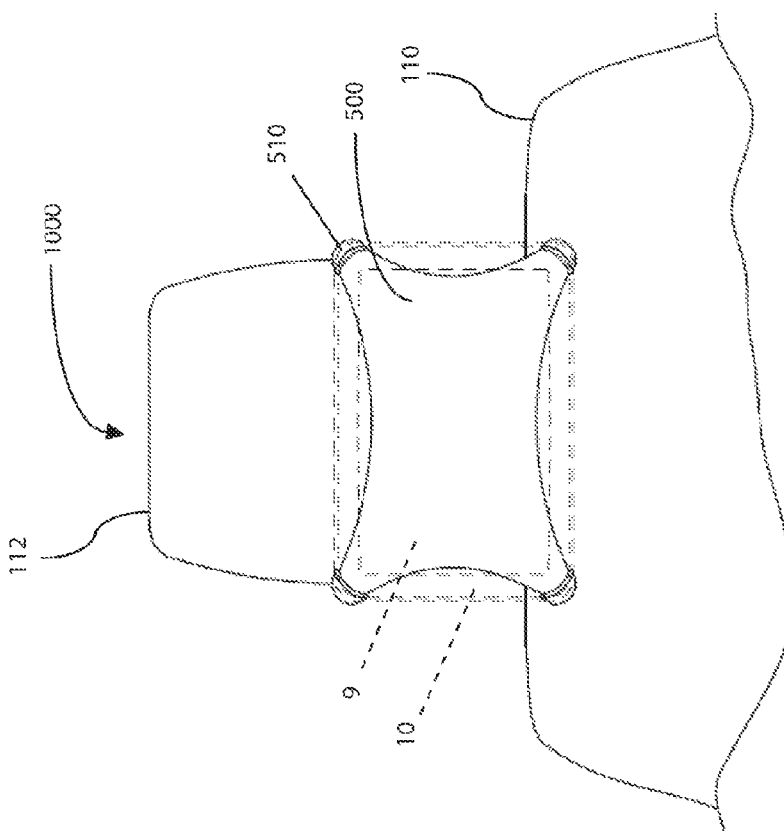
FIG. 13A depicts a front side perspective view of another embodiment of a portable visual display mounting device, showing the attachment of an embodiment of a visual display panel in landscape view, in accordance with embodiments described herein.

Referring still further to the drawings, FIG. 13A shows a portable visual display system 1000, with a portable visual display device 10 and visual display 9 mounted or clipped into the mounting clip or dock 500, and secured by the corner lips 510 of the mounting clip or dock 500. As depicted in FIG. 13A, the embodiment of a portable visual display device 10 is retained by the visual display system in a landscape-like, or otherwise more horizontal position mounted between the head rest 112 and the seat 110 of a vehicle. FIG. 13B shows a portable visual display system 1000, with a portable visual display device 10 and visual display 9 mounted or clipped into the mounting clip or dock 500, and secured by the corner lips 510 of the mounting clip or dock 500. As depicted in FIG. 13B, the embodiment of a portable visual display device 10 is retained by the visual display system in a portrait-like, or otherwise more vertical position mounted between the head rest 112 and seat 110 of a vehicle. With the portable visual display device 10 mounted in a portrait orientation, the complementary guide part 760 attached to the backing plate (see FIG. 12) of the portable visual display mounting device 700 is visible as extending horizontally beyond the mounting posts or bars 115a, 115b connecting the vehicle head rest 112 to the vehicle seat 110, which mounting posts or bars 115a, 115b can also be seen when the portable visual display device 10 is mounted in a portrait-like orientation.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples provided herein.

What is claimed is:

1. A portable visual display panel mounting device comprising:
   a backing plate, having a visual display mounting side and an arm mounting side;
   a pair of articulating arms, each articulating arm including a ratcheting surface and a curved free end having an outermost tip; wherein said pair of articulating arms are pivotably connected at a common axis so that said ratcheting surfaces abut, and wherein at least one of said articulating arms is movably attached to said arm mounting side of said backing plate; and
   a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other;
   wherein, when said pair of articulating arms is in a second position, each tip of each curved free end of each articulating arm, being disparate each other, is located closer to the arm mounting side of the backing plate, than a resultant apex portion of the curved free end of each articulating arm.

2. The device of claim 1, wherein said backing plate has a complementary guide on said arm mounting side of said backing plate to accept a complementary guided part of at least one articulating arm.

3. The device of claim 2, wherein said complementary guided part is selected from a group consisting of a pin, ball, wedge, groove, spindle, roller, magnet, or a hollow geometrical structure.

4. The device of claim 2, wherein a portion of said complementary guided part extends into said complementary guide.

5. The device of claim 1, wherein said biasing member, as operable with said pin, acts upon said articulating arms to drive said ratcheting surfaces of said articulating arms together to securely engage said ratcheting surfaces in operable contact with each other.

6. The device of claim 5, wherein, when said biasing member is compressed, said ratcheting surfaces operably disengage and become free to rotate with respect to each other.

7. The device of claim 1, wherein said common pin has a biasing member restraint at one end for engaging and retaining said biasing member and a articulating arm restraint at the other end for engaging and retaining at least one articulating arm.

8. The device of claim 7, wherein said biasing member is placed between said restraint of said common pin and at least one articulating arm.

9. A method of mounting a portable visual display panel to a standard vehicle head rest having at least two spaced apart mounting posts, said method comprising:
providing a portable visual display device having hook and loop fasteners located on a side opposite a visual display;
providing a portable visual display panel mounting device including:
a backing plate, having a visual display mounting side and an arm mounting side;
a pair of articulating arms, each articulating arm including a ratcheting surface and a curved free end having an outermost tip; wherein said pair of articulating arms are pivotably connected at a common axis so that said ratcheting surfaces abut, and wherein at least one of said articulating arms is movably attached to said arm mounting side of said backing plate; and
a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other;
wherein, when said pair of articulating arms is in a second position, each tip of each curved free end of each articulating arm, being disparate each other, is located closer to the arm mounting side of the backing plate, than a resultant apex portion of the curved free end of each articulating arm;
maneuvering said articulating arms to a first position;
passing said articulating arms, as located in a first position, between spaced apart mounting posts of said standard vehicle head rest; and
maneuvering said articulating arms to a second position, wherein each of said articulating arms separately center respective mounting posts opposite resultant apex portions of the curved free ends of each articulating arm and work to engage and tighten each arm against each mounting post, as said articulating arms are disparately widened, to secure said portable visual display panel mounting device to said mounting posts of said standard vehicle head rest.

10. The method of claim 9, further including attaching said portable visual display device to said portable visual display panel mounting device by positioning said hook and loop fasteners for engagement and fastening.

11. The method of claim 9, wherein said backing plate has a complementary guide on at least one side to accept a complementary guided part of at least one articulating arm, wherein said articulating arms are maneuvered between said first and second positions by slidably moving said complementary guided part within said complementary guide.

12. The method of claim 9, wherein said portable visual display panel is disengaged by moving the common pin to compress the biasing member, thereby allowing free rotational movement between said ratcheting surfaces.

13. A portable visual display system comprising:
a portable visual display device having hook and loop fasteners located on a side opposite a visual display;
a vehicle head rest having two spaced apart mounting posts; and
a portable visual display panel mounting device comprising:
a pair of articulating arms, each articulating arm having a ratcheting surface and a curved free end; wherein said pair of articulating arms are pivotably connected at a common axis so that said ratcheting surfaces abut, and wherein at least one of said articulating arms is movably attached to an arm mounting side of a backing plate; and
a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other;
wherein, when said pair of articulating arms is in a first position, said pair of arms, being proximate each other, are configured to pass between said mounting posts of said vehicle seat head rest, and, when said pair of articulating arms is moved into a second position, said pair of arms are configured to separately respectively engage, center and tighten against each mounting post, as said arms are disparately widened, to secure said portable visual display panel mounting device to said mounting posts of said vehicle head rest.

14. A portable visual display system comprising:
a portable visual display panel mounting device including:
a backing plate operable with a complementary guide part;
a pair of articulating arms, each articulating arm having a ratcheting surface and a curved free end; wherein said pair of articulating arms are pivotably connected at a common axis so that said ratcheting surfaces abut, and wherein at least one of said articulating arms is movably attached to an arm mounting side of a backing plate;
wherein the opposing ends to the curved free ends of the articulating arms are complementary guided pin parts, which slide and fit into the complementary guided part of the backing plate; and
a common pin operable with a biasing member, wherein said common pin and said biasing member are located to facilitate pivotable connection of said articulating arms at said common axis so that said articulating arms are movable between a first position, wherein said curved ends of each articulating arm are proximately located next to each other, and a second position, wherein said curved ends of each articulating arm are disparately located away from each other;
a portable visual display device having a mounting clip, wherein said mounting clip has a lip configured to flex into a position around a portion of a visual display panel to retain and support the visual display panel, and wherein the mounting clip further includes a fastening portion attached to the back of said mounting clip, wherein the fastening portion slides to fit over and connect with an edge and associated notch of the backing plate of the portable visual display panel mounting device; and a vehicle head rest having two spaced apart mounting posts or bars;

wherein, when said pair of articulating arms of said portable visual display panel mounting device is in a first position, said pair of arms, being proximate each other, are configured to pass between said mounting posts or bars of said vehicle seat head rest, and, when said pair of articulating arms is moved into a second position, said pair of arms are configured to separately respectively engage, center and tighten against each mounting post or bar, as said arms are disparately widened, to secure said portable visual display panel mounting device to said mounting posts or bars of said vehicle head rest.

15. The device of claim 14 wherein the lip of the mounting clip is made of a flexible plastic and fitted to snap onto a portion of the visual display.

16. The device of claim 14 wherein the fastening portion is removably attached to the back of said mounting clip.

17. The device of claim 14 wherein the fastening portion is integrally formed with the back of said mounting clip.

* * * * *

UNITED STATES PATENT AND TRADEMARK OFFICE
CERTIFICATE OF CORRECTION

| | | |
|---|---|---|
| PATENT NO. | : 8,864,000 B2 | Page 1 of 1 |
| APPLICATION NO. | : 12/869394 | |
| DATED | : October 21, 2014 | |
| INVENTOR(S) | : Meyer | |

It is certified that error appears in the above-identified patent and that said Letters Patent is hereby corrected as shown below:

In the Claims

<u>COLUMN 13 CLAIM 7</u>

Line 9 delete "a articulating" and insert -- an articulating --

Signed and Sealed this
Second Day of June, 2015

Michelle K. Lee
*Director of the United States Patent and Trademark Office*